(12) United States Patent
Schwamm

(10) Patent No.: US 6,979,925 B2
(45) Date of Patent: Dec. 27, 2005

(54) ELECTRICAL DRIVING ARRANGEMENT

(75) Inventor: Friedrich Schwamm, Zorneding (DE)

(73) Assignee: MTU Aero Engines GmbH, Munich (DE)

( * ) Notice: Subject to any disclaimer, the term of this patent is extended or adjusted under 35 U.S.C. 154(b) by 0 days.

(21) Appl. No.: 10/660,762

(22) Filed: Sep. 12, 2003

(65) Prior Publication Data

US 2005/0189832 A1    Sep. 1, 2005

(30) Foreign Application Priority Data

Sep. 14, 2002 (DE) ............................... 102 42 833

(51) Int. Cl.$^7$ ............................................ H02K 21/04
(52) U.S. Cl. ..................................... 310/163; 310/266
(58) Field of Search ................................ 310/163, 266, 310/268

(56) References Cited

U.S. PATENT DOCUMENTS

| 5,051,641 A | * | 9/1991 | Weh | 310/163 |
| 5,289,072 A | * | 2/1994 | Lange | 310/266 |
| 5,717,262 A | * | 2/1998 | Muller et al. | 310/60 A |
| 5,773,910 A | * | 6/1998 | Lange | 310/266 |
| 5,783,886 A | * | 7/1998 | Hong | 310/90.5 |
| 6,236,131 B1 | * | 5/2001 | Schafer | 310/163 |

FOREIGN PATENT DOCUMENTS

| DE | 3927453 A1 | 2/1991 | ......... H02K 21/00 |
| DE | 4443999 C1 | 4/1996 | ......... H02K 21/00 |

\* cited by examiner

*Primary Examiner*—Darren Schuberg
*Assistant Examiner*—Nguyen N. Hanh
(74) *Attorney, Agent, or Firm*—Crowell & Moring LLP

(57) ABSTRACT

The invention concerns an electric drive device, namely a transverse flow motor. The transverse flow motor has a stator and a rotor, whereby the stator includes U-shaped stator blades which form a cylindrical ring, and whereby the rotor has permanent magnets which are arranged at the pole ends of the stator blades and which form cylindrical or annular rotor elements. In accordance with the invention, the U-shaped stator blades of the stator form two cylindrical rings, whereby in each case one of the two rings is arranged at one side of the rotor such that the rotor is laterally surrounded by the two rings.

11 Claims, 4 Drawing Sheets

ELECTRICAL DRIVING ARRANGEMENT

CROSS-REFERENCE TO RELATED APPLICATIONS

This application claims priority to DE 102 42 833.6, which was filed Sep. 14, 2002, the contents of which are incorporated by reference in their entirety.

BACKGROUND OF THE INVENTION

The invention concerns an electric drive device.

A large number of electric drive devices are known on the basis of the state of the art. Hence, one distinguishes direct current motors from three phase current motors and synchronous motors from asynchronous motors on the basis of the state of the art.

The so-called transverse flow motor represents a completely new concept for such an electric drive device in comparison with the previously common electric drive devices. Transverse flow motors allow optimizing important characteristics of electric drive devices, namely achieving a compact construction, restricting the mass and therewith the weight, as well as simultaneously guaranteeing a high power density and therewith higher efficiency of the electric drive device.

SUMMARY OF THE INVENTION

The present invention concerns the area of transverse flow motors.

The present invention is based upon the problem of creating an improved electric drive device, namely an improved transverse flow motor.

This problem is solved by an electric drive as described within the specification and claims.

Preferred refinements of the invention emerge from the specification and claims.

DETAILED DESCRIPTION OF THE INVENTION

Figure 1:
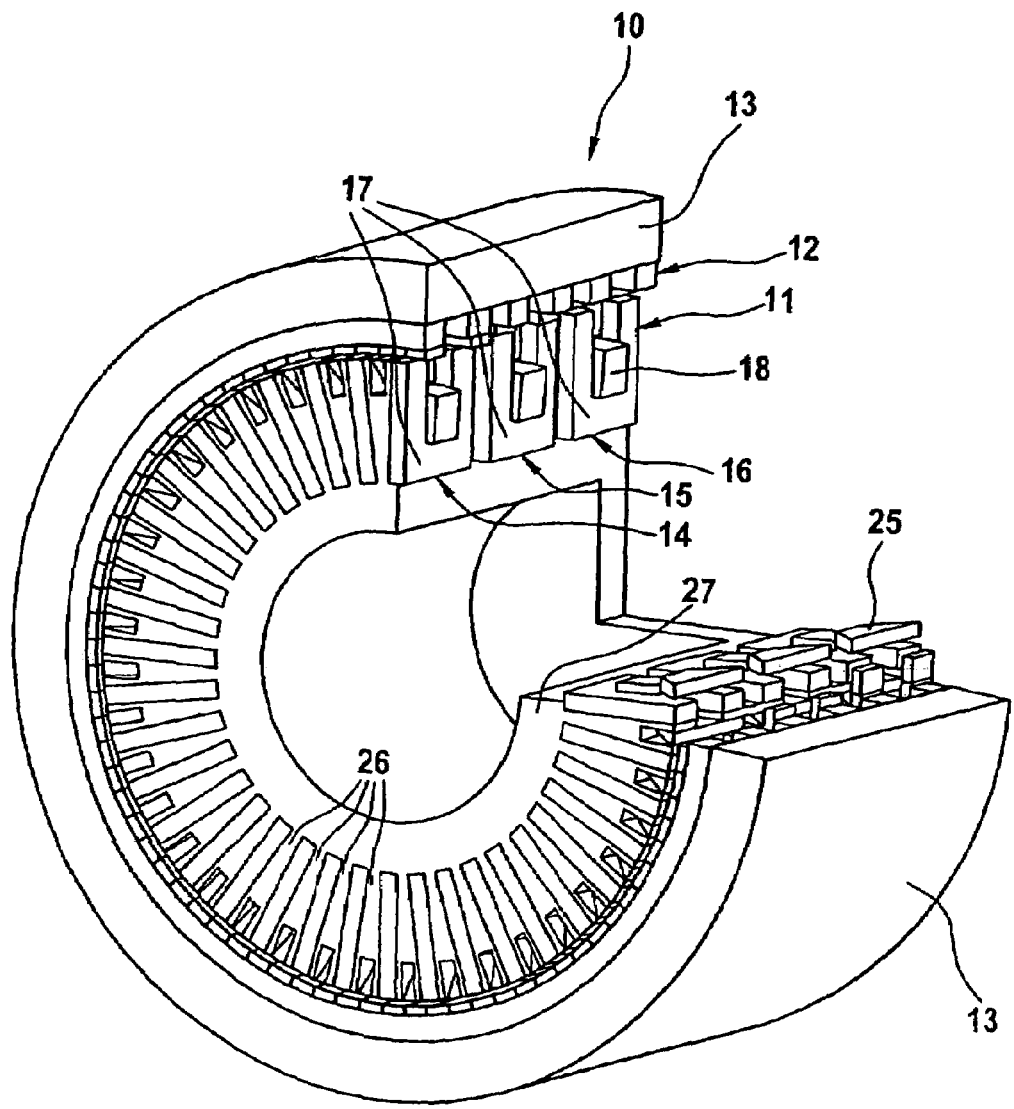
FIG. 1: Illustrates a schematized representation of an electric drive device according to the state of the art in a partially broken up, perspective side view.

FIG. 1 shows an electric drive device according to the state of the art constructed as a transverse flow motor 10. The transverse flow motor 10 illustrated there includes a cylindrically constructed stator 11 and a cylindrically constructed rotor 12, whereby the rotor 12 is arranged outside the stator 11. In other words, the outer rotor 12 surrounds the internal stator 11. An object 13 to be driven by the transverse flow motor 10, e.g., a wheel or a turbine blade, is directly connected with the rotor 12.

Three phases 14, 15 and 16 are arranged alongside one another in the transverse flow motor 10 represented in FIG. 1 so that a (not represented) converter can be used for three phase current.

Figure 2:
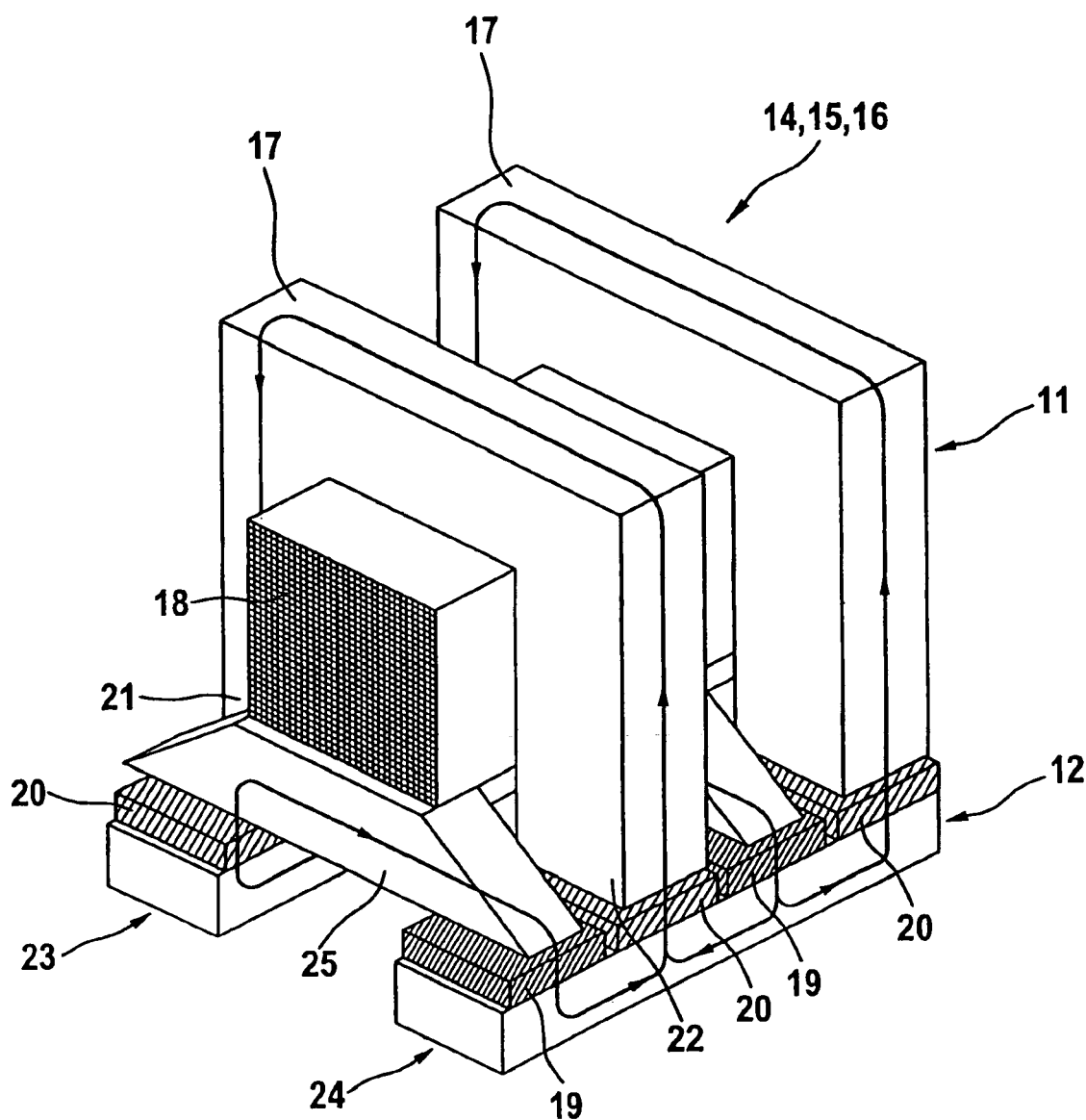
FIG. 2: Illustrates a detail of the electric drive device according to the state of the art in accordance with FIG. 1, likewise in perspective side view.

FIG. 2 clarifies the operating principle underlying the transverse flow motor 10 on the example of phase 14, 15 or 16. The magnetic flow is visualized by flow lines. Thus FIG. 2 depicts one of phases 14, 15 or 16 consisting of rotor 12 and stator 11. The stator 11 encloses several U-shaped constructed stator blades 17 arranged at a distance from one another, whereby the stator blades 17 are surrounded by current-carrying windings 18, or surround such. The stator blades 17 of each phase 14, 15 and 16 form a cylindrical ring (see FIG. 1).

Permanent magnets 19, 20 of the rotor 12 are constructed with alternating polarity. That is, a permanent magnet 20 respectively constructed as North Pole is arranged between two permanent magnets 19 respectively constructed as South Pole. In accordance with FIG. 2, a respectively annularly or cylindrically constructed rotor element 23, 24 of the rotor 12 with polarity alternating permanent magnets 19, 20 is arranged adjacent to the two opposed pole ends 21, 22 of the U-shaped stator blades 17. Each phase 14, 15 or 16 of the transverse flow motor 10 is accordingly allocated two such rotor elements 23, 24, in each case one in the region of one of the pole ends of the U-shaped stator blades 17.

Furthermore, in accordance with FIG. 2, respectively one permanent magnet 19, 20 with likewise alternating polarity is also allocated to the two opposed pole ends 21, 22 of a single stator blade 17. From this it follows first that two adjacent permanent magnets 19, 20 of rotor element 23 or 24 have a different polarity within a single rotor element 23 or 24 which extends in the region of a pole end of stator blade 17. Second, opposed permanent magnets 19, 20 which are allocated to opposite pole ends 21, 22 of a stator blade 17 are constructed differently in their polarity.

To complete the magnetic flow and therewith to increase the degree of efficiency, a respectively I-shaped constructed stator element 25 is arranged between two U-shaped constructed stator blades 17 in each case. Nonetheless, it is possible to dispense with the stator elements 25 even with a slightly modified construction principle.

As can be inferred from FIG. 1 in particular, the hollow space between adjacent stator blades 17 is filled by segments 26 of non-magnetic material, on the one hand to obtain a stable construction, and on the other not to impair the magnetic flow. The segments 26 project radially out of a likewise non-magnetic cylindrical foundation 27.

With the transverse flow motor 10, the flow is accordingly guided into the stator blades 17 perpendicular to the direction of motion or parallel to the axis of rotation of the rotor 12. The windings 18 in contrast run in the direction of motion of the rotor. The cross sections of the windings 18 and the stator blades 17 can be selected independently of each other. From this, there results a small realizable phase spacing through which a high degree of efficiency can be attained with winding losses remaining constant.

Figure 3:
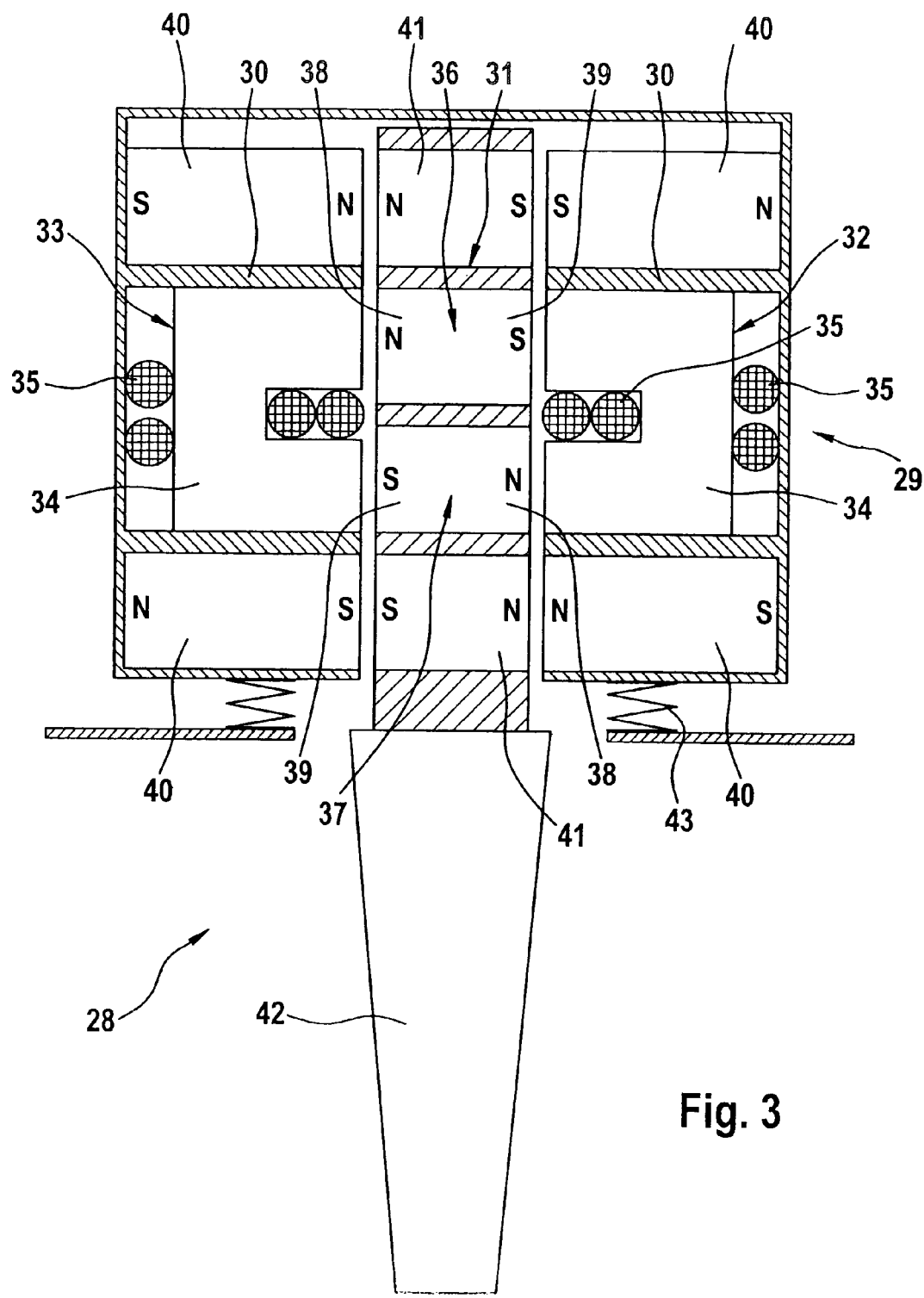
FIG. 3: A strongly schematized representation of an electric drive device within the sense of the invention with a compressor blade fastened on a rotor of the electric drive device.
Figure 4:
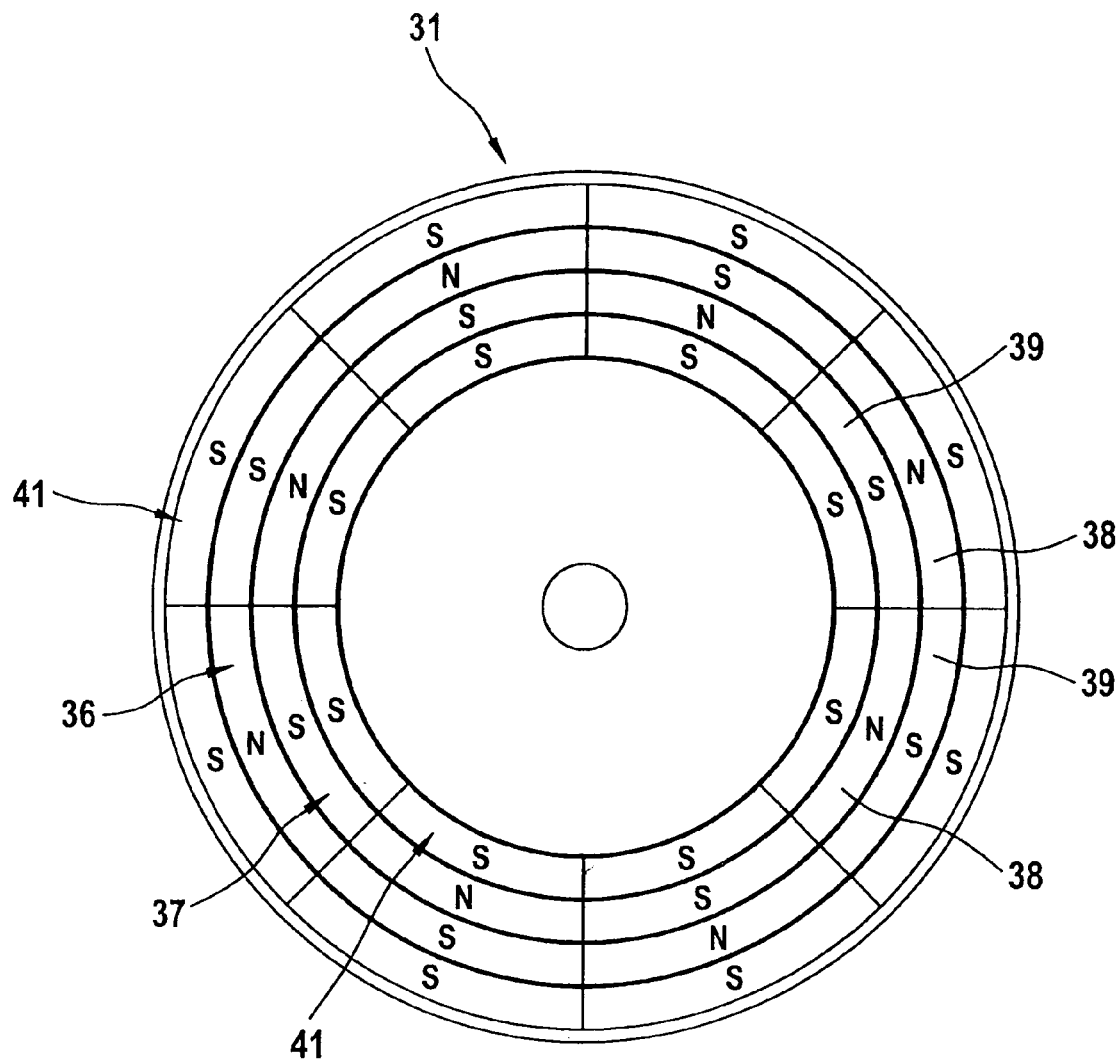
FIG. 4: A strongly schematized representation of a rotor of the electric drive device of the invention.

Henceforth an electric drive device constructed as a transverse flow motor 28 is being proposed within the meaning of the invention as it is illustrated in FIGS. 3 and 4. FIGS. 3 and 4 clarify the electric drive device of the invention with reference to the example of a phase 29, whereby even here, as with the state of the art in accordance with FIGS. 1 and 2, a total of three phases can be present.

In accordance with FIG. 3, the phase 29 of the transverse flow motor 28 shown there once again includes a stator 30 and a rotor 31. As distinct from the state of the art, the stator 30 of the transverse flow motor 28 of the invention nonetheless has available two cylindrical rings 32, 33 of U-shaped stator blades 34 arranged on both sides of the rotor 31, whereby the stator blades 34 are once again surrounded by current-carrying windings 35, or else surround such.

The disk or ring-like constructed rotor 31 is accordingly included or enclosed by the likewise annular constructed stator 30 such that respectively one of the two rings 32, 33 of U-shaped stator blades 34 is arranged to one side of the rotor 31.

The rotor 31 once again has annularly or cylindrically constructed rotor elements 36, 37 arranged at the opposite pole ends of the U-shaped stator blades 34 with polarity-alternating permanent magnets 38, 39. As distinct from the state of the art in accordance with FIGS. 1 and 2, each of the rotor elements 36, 37 includes not only one ring of polarity-alternating permanent magnets 38, 39, but rather two rings of polarity-alternating permanent magnets 38, 39.

Opposed permanent magnets 38, 39 of opposed rotor elements 36, 37 have an alternating polarity (North Pole, South Pole). Furthermore, adjacent permanent magnets 38, 39 of the two adjacent rings inside a rotor element 36 or 37 have an alternating polarity. Furthermore, adjacent permanent magnets 38, 39 inside a ring or a rotor element 36 or 37 have available an alternating polarity.

The rotor 31 of the transverse flow motor 28 of the invention accordingly disposes over two rotor elements 36 or 37 in the region of a phase 29 which both are surrounded by the two cylindrical rings 32, 33 of the U-shaped stator blades 34 of this phase 29. In each case, one of the two rotor elements 36 or 37 is arranged between opposite pole ends of opposed stator blades 34. Each rotor element 36 or 37 has available two rings of permanent magnets 38, 39 (see FIG. 3).

Due to this configuration of rotor 31 and stator 30 of the invention, a greater power density of the transverse flow motor can be attained with a constant compact construction. Even at a constant power density, once again a reduction in weight of the transverse flow motor can be achieved in relation to the state of the art. In addition to this, a redundancy with respect to the current-carrying windings is created that is especially of importance for applications in aeronautical engineering.

In accordance with FIGS. 3, 4, additional permanent magnets 40, 41 may be arranged on the one hand about the U-shaped stator blades 34 of the stator 30 and on the other hand about the permanent magnets 38, 39 of the rotor 31 which serve for magnetic centering of the rotor 31. Also due to this, the construction can once again be compressed. The stator 30 may be spring-mounted through spring elements 43. Arising centrifugal forces may be absorbed with slight mechanical bracing.

In accordance with FIG. 3, an object 42 to be driven, a turbine blade of a high pressure compressor may be arranged at one end of the rotor 31.

The design of the invention for an electrical drive device may equally be used in a motor operation and in a generator operation.

The use of the design of the invention in aeronautical engineering is especially advantageous, where a weight saving and a high power density are of particular interest. An electric drive device of the invention can, for example, be used for the electric starting of an aircraft propulsion unit or for the provision of an aircraft with electricity or for any other suitable application.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An electric drive arrangement comprising:
    a stator, said stator including U-shaped stator blades forming a cylindrical ring; and
    a rotor, said rotor including permanent magnets arranged at pole ends of said stator blades;
    wherein said permanent magnets form two cylindrical rotor elements, and
    wherein said stator blades form two cylindrical stator rings, each of said two cylindrical stator rings being arranged at opposite sides of said rotor such that said rotor is laterally surrounded by said two cylindrical stator rings;
    wherein said rotor being disk-shaped.

2. The electric drive arrangement of claim 1, wherein a first of said two cylindrical rotor elements includes a first ring of polarity-alternating magnets and a second ring of polarity-alternating magnets and wherein a second of said two cylindrical rotor elements includes a third ring of polarity-alternating magnets and a fourth ring of polarity-alternating magnets.

3. The electric drive arrangement of claim 2, wherein adjacent magnets in said first ring have different polarity from one another, adjacent magnets in said second have different polarity from one another, adjacent magnets in said third ring have different polarity from one another, and adjacent magnets in said fourth ring have different polarity from one another.

4. The electric drive element of claim 2, wherein adjacent magnets in said first and said second rings have different polarity from one another and adjacent magnets in said third and fourth rings have different polarity from one another.

5. The electric drive element of claim 2, wherein opposing magnets in said first of two said cylindrical rotor elements and said second of two cylindrical rotor elements have different polarity from one another.

6. The electric drive element of claim 2, wherein opposing magnets in said first ring and said third ring have different polarity from one another and opposing magnets in said second ring and said fourth ring have different polarity from one another.

7. The electric drive arrangement of claim 2, wherein additional permanent magnets are arranged about said stator blades and about said permanent magnets of said rotor for magnetic centering of said rotor.

8. An electric drive arrangement comprising:
    a stator, said stator including U-shaped stator blades forming a cylindrical ring; and
    a rotor, said rotor including permanent magnets arranged at pole ends of said stator blades;
    wherein said permanent magnets form two cylindrical rotor elements, and
    wherein said stator blades form two cylindrical stator rings, each of said two cylindrical stator rings being arranged at opposite sides of said rotor such that said rotor is laterally surrounded by said two cylindrical stator rings;

wherein said rotor being disk-shaped;

wherein said two cylindrical rotor elements extend in a region of said pole ends of said stator blades, and wherein each of said two cylindrical rotor elements has two rings of polarity-alternating magnets.

9. The electric drive arrangement of claim 8, wherein, within each of said two cylindrical rotor elements, adjacent permanent magnets of one of said two rings have different polarity from one another and adjacent permanent magnets of a first and a second of said two rings have different polarity from one another.

10. The electric drive arrangement of claim 8, wherein permanent magnets from said first of said two cylindrical rotor elements have different polarity from opposed permanent magnets in said second of said two cylindrical rotor elements.

11. The electric drive arrangement of claim 8, wherein additional permanent magnets are arranged about said stator blades and about said permanent magnets of said rotor for magnetic centering of said rotor.

* * * * *